US006898731B2

United States Patent
Hack et al.

(10) Patent No.: US 6,898,731 B2
(45) Date of Patent: May 24, 2005

(54) SYSTEM, METHOD, AND COMPUTER PROGRAM PRODUCT FOR PREVENTING MACHINE CRASHES DUE TO HARD ERRORS IN LOGICALLY PARTITIONED SYSTEMS

(75) Inventors: Mark Elliott Hack, Cedar Park, TX (US); Alongkorn Kitamorn, Austin, TX (US); Gordon D. McIntosh, Austin, TX (US); Milton Devon Miller, II, Austin, TX (US); Kanisha Patel, Cedar Park, TX (US); David Lee Randall, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/045,280

(22) Filed: Jan. 10, 2002

(65) Prior Publication Data

US 2003/0131279 A1 Jul. 10, 2003

(51) Int. Cl.[7] .............................................. G06F 11/00
(52) U.S. Cl. ............................................ 714/10; 714/9
(58) Field of Search .................................. 714/10, 8, 9

(56) References Cited

U.S. PATENT DOCUMENTS

| 5,345,590 | A | * | 9/1994 | Ault et al. ..................... 718/1 |
| 5,564,040 | A | * | 10/1996 | Kubala ........................ 711/173 |
| 5,815,651 | A | * | 9/1998 | Litt ............................... 714/10 |
| 6,233,680 | B1 | * | 5/2001 | Bossen et al. .................. 713/1 |
| 6,378,027 | B1 | * | 4/2002 | Bealkowski et al. ........ 710/302 |
| 6,516,429 | B1 | * | 2/2003 | Bossen et al. ................. 714/47 |
| 6,658,591 | B1 | * | 12/2003 | Arndt ............................. 714/6 |
| 6,711,700 | B2 | * | 3/2004 | Armstrong et al. ........... 714/23 |
| 6,789,048 | B2 | * | 9/2004 | Arndt et al. ................ 702/186 |
| 6,836,855 | B2 | * | 12/2004 | Arndt ............................. 714/9 |
| 2003/0023932 | A1 | * | 1/2003 | Arndt et al. ................ 714/805 |
| 2004/0090925 | A1 | * | 5/2004 | Schoeberl et al. .......... 370/254 |

OTHER PUBLICATIONS

Microsoft Computer Dictionary, Fourth Edition; Microsoft Press, 1999, pp. 173, 213.*

* cited by examiner

*Primary Examiner*—Scott Baderman
*Assistant Examiner*—Joshua Lohn
(74) *Attorney, Agent, or Firm*—Duke W. Yee; Mark E. McBurney; Lisa L.B. Yociss

(57) ABSTRACT

A system, method, and computer program product are disclosed for preventing machine crashes due to hard errors in one of multiple, different processors that are included in a logically partitioned data processing system. An error occurring in one of the processors is detected. A determination is then made regarding whether the processor has been deconfigured. The partition is then rebooted only in response to a determination that the processor has been deconfigured and will not be included in the partition processor resources. Thus, only the configured processors are rebooted. The deconfigured processor is not rebooted.

39 Claims, 4 Drawing Sheets

SYSTEM, METHOD, AND COMPUTER PROGRAM PRODUCT FOR PREVENTING MACHINE CRASHES DUE TO HARD ERRORS IN LOGICALLY PARTITIONED SYSTEMS

BACKGROUND OF THE INVENTION

1. Technical Field

The present invention relates generally to the field of computer systems and, more specifically to a system, method, and computer program product for preventing machine crashes due to hard errors in logically partitioned systems.

2. Description of Related Art

A logical partitioning option (LPAR) within a data processing system (platform) allows multiple copies of a single operating system (OS) or multiple heterogeneous operating systems to be simultaneously run on a single data processing system hardware platform. A partition, within which an operating system image runs, is assigned a non-overlapping subset of the platform's hardware resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

Hard errors sometimes occur in processors, however. Hard errors, or fatal errors, are those errors which cause the processor to crash. In logically partitioned systems that include multiple processors, a hard error may occur in only one processor causing the crash of only one partition while the remaining processors, and thus their partitions, continue to operate. One type of hard error is an error that occurs in the address translation logic within the processor. For example, some processors include as part of their address translation logic a translation look aside buffer (TLB), and may also include a data effective to real address translation (D-ERAT) buffer. An error may occur in either, or both, of these buffers.

In some logically partitioned systems, a hard error occurring in the address translation logic of a single processor can result in a crash of the entire logically partitioned system. When such an error is detected, a request is made to deconfigure the processor within which the error occurred. After this request is made, a request is made to reboot that partition. If the deconfiguration of the processor is not complete when the partition is rebooted, the entire machine will crash. Because the code path length for reboot code is significantly shorter than the path length for the deconfiguration code, the reboot code will be executed prior to the deconfiguration being completed.

A processor is "deconfigured" when all execution streams have been removed from the processor and it has been successfully marked as unusable for use in subsequent reboot. Marking a processor as "bad" indicates that the processor can no longer be used.

Therefore, a need exists for a method, system, and product whereby machine crashes due to hard errors in logically partitioned systems are prevented.

SUMMARY OF THE INVENTION

A system, method, and computer program product are disclosed for preventing machine crashes due to hard errors in one of multiple, different processors that are included in a logically partitioned data processing system. An error occurring in one of the processors is detected. A determination is then made regarding whether the processor has been deconfigured. The partition is then rebooted only in response to a determination that the processor has been deconfigured and will not be included in the partition processor resources. Thus, only the configured processors are rebooted. The deconfigured processor is not rebooted.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a system, method, and computer program product for preventing crashes of an entire machine due to hard errors in just one of a plurality of processors that are included in a logically partitioned data processing system. A crash of the entire machine occurs when all of the partitions have crashed.

The logically partitioned data processing system includes an error handler routine and a service processor. The error handler routine first detects an error in one of the processors. This error is a hard error, such as an address translation logic error in the processor such as might occur in a TLB or D-ERAT.

In response to the error handler routine detecting an error, the error handler routine transmits a request to the service processor to deconfigure the processor. The service processor then services this request by deconfiguring the processor. When the service processor has finished servicing the deconfiguration request, the service processor stores an indication in a non-volatile memory that the processor has been deconfigured. The error handler routine waits until this indication has been stored before it transmits a request to reboot the partition. The service processor does not reboot the partition until the processor has been deconfigured. Thus, machine crashes are prevented because the partition is not rebooted until the processor has been deconfigured.

Figure 1:
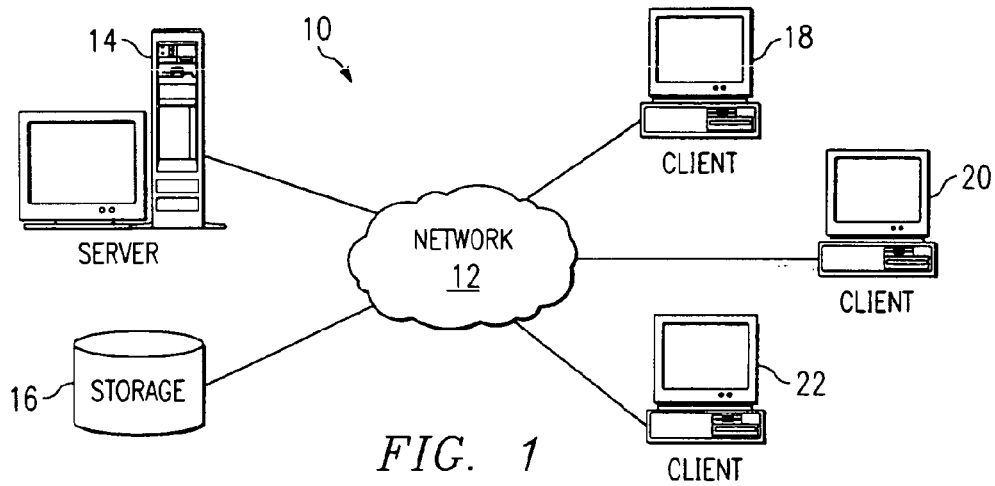
FIG. 1 is a pictorial representation which depicts a data processing system in which the present invention may be implemented in accordance with a preferred embodiment of the present invention.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
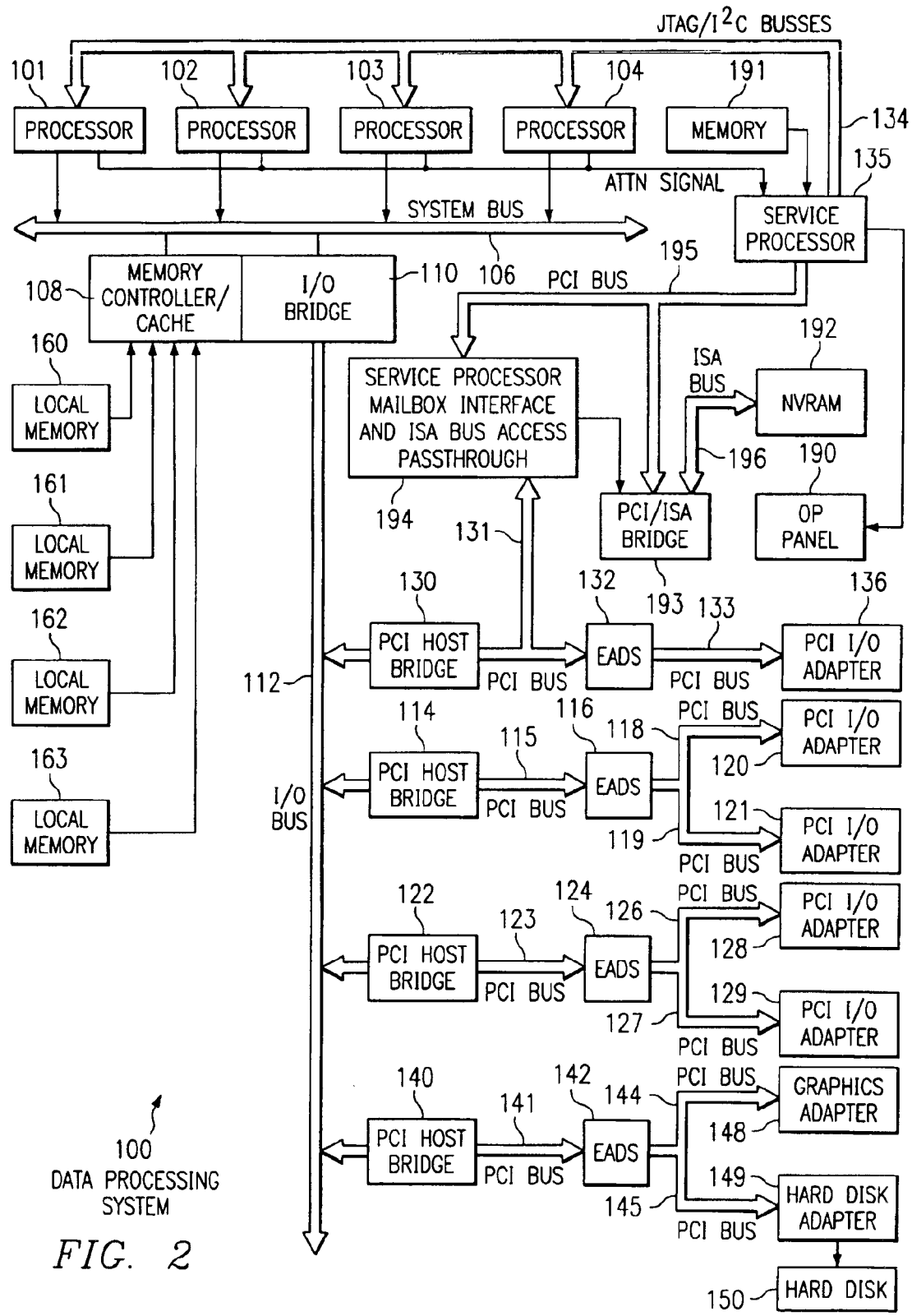
FIG. 2 is a more detailed block diagram of a data processing system in which the present invention may be implemented in accordance with the present invention.

FIG. 2 is a more detailed block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI-PCI bridge) via PCI buses 144 and 145 as depicted. Also, a hard disk 150 may also be connected to I/O bus 112 through PCI Host Bridge 140 and EADS 142 via PCI-buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATS, and memory tests are gathered and reported by service processor 135.

If a meaningful/valid configuration of system resources is still possible after taking out the elements found to be faulty during the BISTS, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
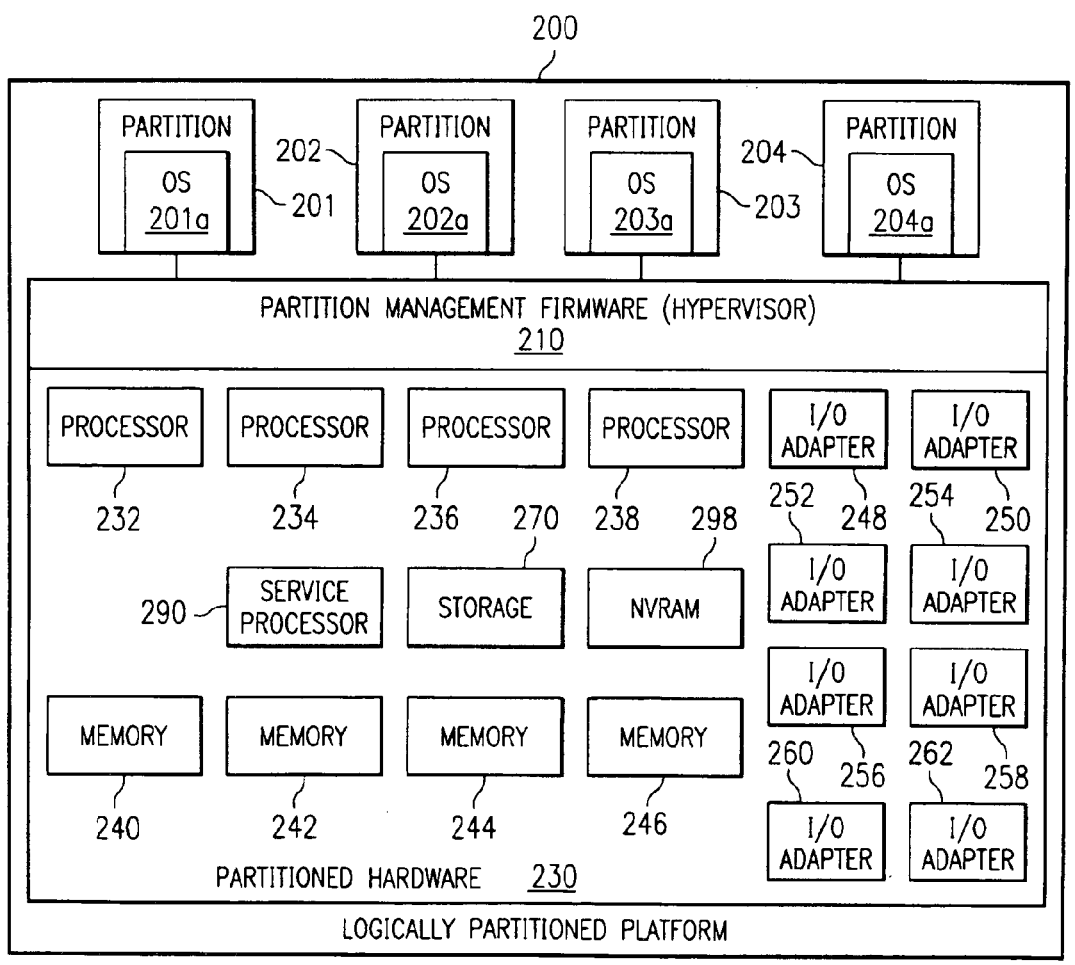
FIG. 3 is a block diagram of an exemplary logically partitioned platform in which the present invention may be implemented.

FIG. 3 is a block diagram of an exemplary logically partitioned platform is depicted in which the present invention may be implemented. Logically partitioned platform 200 includes partitioned hardware 230, partition management firmware, also called a hypervisor, 210, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions 201–204.

Partition management firmware (hypervisor) 210 performs a number of functions and services for partitions 201–204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

Figure 4:
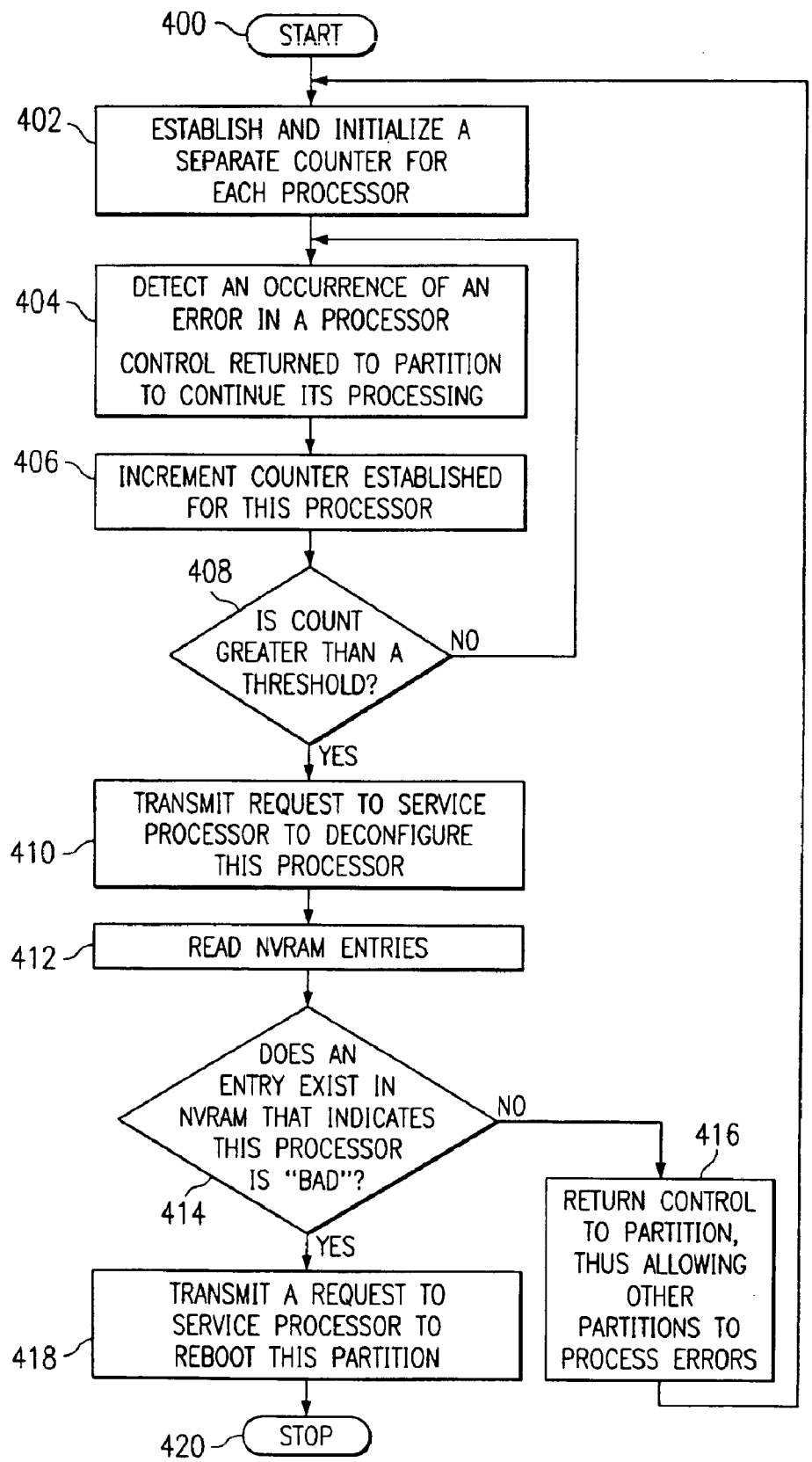
FIG. 4 illustrates a high level flow chart which depicts an exception handler routine requesting a reboot of a partition only in response to a completion of a deconfiguration of the processor in accordance with the present invention.

FIG. 4 illustrates a high level flow chart which depicts an exception handler routine requesting a reboot of a partition only in response to a completion of a deconfiguration of the processor in accordance with the present invention. The process starts as depicted by block 400 and thereafter passes to block 402 which illustrates establishing and initializing a separate counter for each processor included in a logically partitioned system. The process then passes to block 404 which depicts detecting an occurrence of an error in a processor. The error is a hard error. Typically, the hard error will be an address translation logic error. Address translation logic errors may occur in either a TLB or D-ERAT. These errors are counted separately. A count of TLB errors are maintained, and a count of D-ERAT errors are maintained separately for each processor. Therefore, the present invention may preferably be implemented using a plurality of counters, each counting different types of errors for each processor.

Next, block 406 illustrates incrementing the counter that was established for this processor. Thereafter, block 408 depicts determining whether the count for this processor is greater than a predetermined threshold. If a determination is made that the count for this processor is not greater than the predetermined threshold, the process passes to block 404. Referring again to block 408, if a determination is made that the count for this processor is greater than the predetermined threshold, the process passes to block 410 which depicts transmitting a request to the service processor to deconfigure this processor. Next, block 412 illustrates reading the entries stored in NVRAM 298. Thereafter, block 414 depicts a determination of whether or not an entry exists within NVRAM 298 that this indicates that processor has been marked as bad. If a determination is made that no entry exists within NVRAM 298 that indicates that this processor has been marked as bad, the process passes to block 402 which illustrates returning control to this processor's partition. In this manner, errors occurring in other partitions may be processed while this processor is being deconfigured. The process passes back to block 402.

Referring again to block 414, if a determination is made that an entry does exist in NVRAM 298 that indicates that this processor has been marked as bad, the process passes to block 418 which depicts transmitting a request to a service processor, such as service processor 135 or 290, to reboot this partition. The process then terminates as illustrated by block 420.

Figure 5:
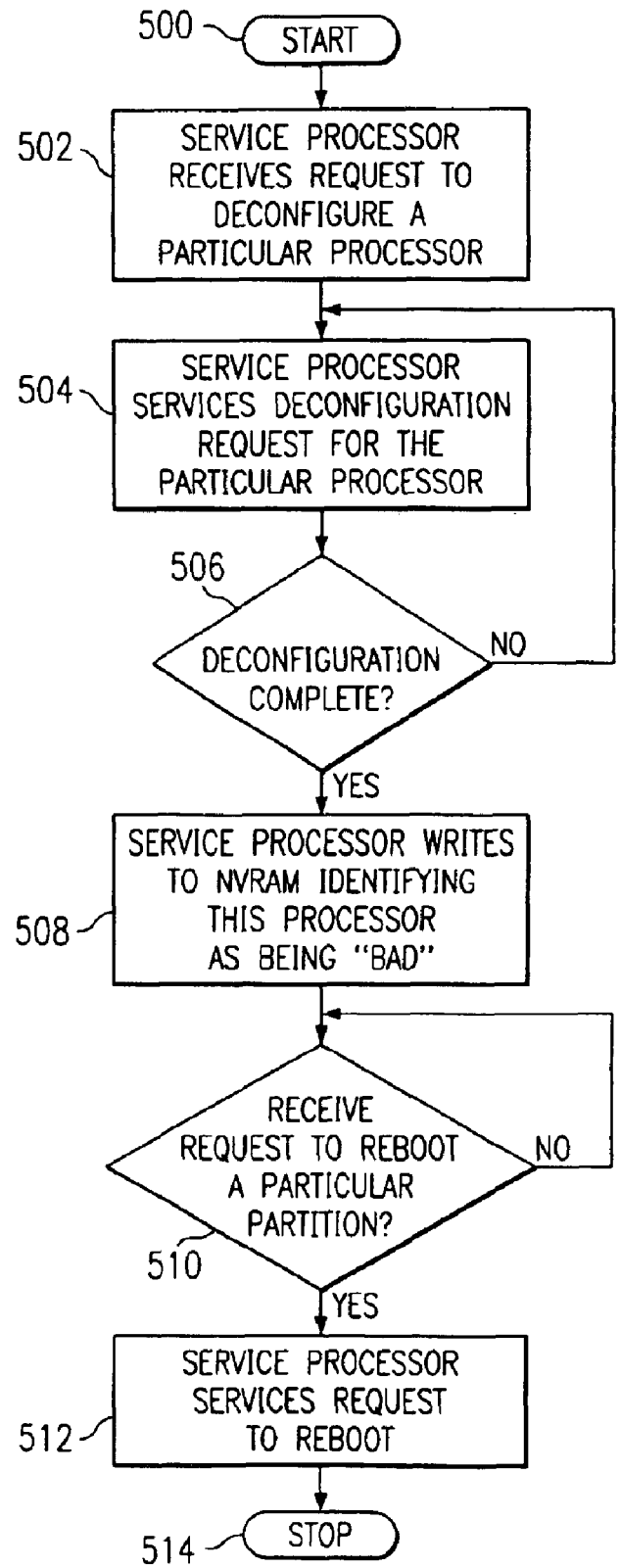
FIG. 5 depicts a high level flow chart which illustrates a service processor storing an indication that a processor as been deconfigured in response to a completion of the deconfiguration of the processor in accordance with the present invention.

FIG. 5 depicts a high level flow chart which illustrates a service processor storing an indication that a processor as been deconfigured in response to a completion of the deconfiguration of the processor in accordance with the present invention. The process starts as depicted by block 500 and thereafter passes to block 502 which illustrates a service processor, such as service processor 135 or 290, receiving a request to deconfigure a particular processor. Next, block 504 depicts the service processor servicing the deconfiguration request for the particular processor. Thereafter, block 506 illustrates a determination of whether or not the deconfiguration is complete. If a determination is made that the deconfiguration is not complete, the process passes back to block 504. Referring again to block 506, if a determination is made that the deconfiguration process is complete, the process passes to block 508 which depicts the service processor writing an entry into the NVRAM identifying this processor as being bad. The process then passes to block 510 which illustrates a determination of whether or not the service processor has received a request to reboot a particular partition. If a determination is made that the service processor has not received a request to reboot a particular partition, the process passes back to block 510. Referring again to block 510, if a determination is made that the service processor has received a request to reboot a particular partition, the process passes to block 512 which depicts the service processor processing the reboot request. The process then terminates as illustrated by block 514.

The following is example pseudo code that may be used to implement the present invention:

If TLB error count>threshold
then
    UNMASK core FIR for TLB error. (This raises an exception to the service processor that the processor has an error)
    Obtain processor id using get_processor_id( ) function call
    call routine to read NVRAM processor entry
        if processor NVRAM entry=bad
            reboot partition
        endif
endif
return to partition code The following pseudo code may be added to the logical partition manager code:
If NVRAM entry for processor id is bad
then
    do not use
endif It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for preventing machine crashes due to hard errors in one of a plurality of processors in a logically partitioned data processing system, said method comprising the steps of:
    detecting an error in one of said plurality of processors;
    starting a deconfiguration process to deconfigure said one of said plurality of processors;
    determining whether said deconfiguration process to deconfigure said one of said plurality of processors has been completed;
    waiting until said deconfiguration process has been completed before requesting said reboot of said system;
    requesting said reboot of said system only in response to a determination that said deconfiguration process has been completed; and
    rebooting only configured ones of said plurality of processors only after said deconfiguration process has been completed.

2. The method according to claim 1, further comprising the step of in response to said detecting an error, requesting deconfiguration of said one of said plurality of processors.

3. The method according to claim 1, further comprising the step of in response to said one of said plurality of processors being deconfigured, providing an indication that said one of said plurality of processors has been deconfigured.

4. The method according to claim 1, further comprising the steps of:
    providing an exception handler routine;
    detecting, utilizing said exception handler routine, said error in said one of said plurality of processors;
    determining, utilizing said exception handler routine, whether said one of said plurality of processors has been deconfigured; and
    requesting, utilizing said exception handler routine, a reboot of said configured ones of said plurality of processors.

5. The method according to claim 4, further comprising the step of requesting, utilizing said exception handler routine, said one of said processors be deconfigured.

6. The method according to claim 1, further comprising the steps of:
   receiving a request to deconfigure said one of said plurality of processors;
   deconfiguring said one of said plurality of processors; and
   storing an indication of deconfiguration in response to a completion of deconfiguring said one of said plurality of processors.

7. The method according to claim 6, further comprising the step of storing said indication in non-volatile memory.

8. The method according to claim 1, further comprising the steps of:
   providing a service processor within said logically partitioned data processing system;
   in response to said detecting an error, deconfiguring said one of said plurality of processors utilizing said service processor; and
   providing, utilizing said service processor, an indication that said one of said plurality of processors has been deconfigured.

9. The method according to claim 1, wherein the step of detecting an error in one of said plurality of processors further comprises the step of detecting a hard error in one of said plurality of processors.

10. The method according to claim 1, wherein the step of detecting an error in one of said plurality of processors further comprises the step of detecting an address translation error in one of said plurality of processors.

11. The method according to claim 1, wherein the step of detecting an error in one of said plurality of processors further comprises the step of detecting a translation look aside buffer address translation error in one of said plurality of processors.

12. The method according to claim 1, wherein the step of detecting an error in one of said plurality of processors further comprises the step of detecting a data effective to real address translation error in one of said plurality of processors.

13. A method for preventing machine crashes due to hard errors in one of a plurality of processors in a logically partitioned data processing system, said method comprising the steps of:
   providing an error handler routine;
   providing a service processor within said logically partitioned data processing system;
   detecting, utilizing said error handler routine, an error in one of said plurality of processors;
   in response to said error handler routine detecting an error, requesting, utilizing said error handler routine, said service processor to deconfigure said one of said plurality of processors;
   deconfiguring, utilizing said service processor, said one of said plurality of processors;
   in response to a completion of said deconfiguration of said one of said plurality of processors, storing, utilizing said service processor, an indication in a non-volatile memory that said one of said plurality of processors has been deconfigured;
   determining, utilizing said error handler routine, whether an indication has been stored in said non-volatile memory indicating that said one of said plurality of processors has been deconfigured;
   only in response to a determination that said indication has been stored in said non-volatile memory that said one of said plurality of processors has been deconfigured, requesting, utilizing said error handler routine, a reboot of configured ones of said plurality of processors; and
   rebooting, utilizing said service processor, said configured ones of said plurality of processors.

14. A logically partitioned data processing system for preventing machine crashes due to hard errors in one of a plurality of processors included in said logically partitioned data processing system, comprising:
   means for detecting an error in one of said plurality of processors;
   means for starting a deconfiguration process to deconfigure said one of said plurality of processors;
   means for determining whether said deconfiguration process to deconfigure said one of said plurality of processors has been completed;
   means for waiting until said deconfiguration process has been completed before requesting said reboot of said system;
   means for requesting said reboot of said system only in response to a determination that said deconfiguration process has been completed; and
   means for rebooting only configured ones of said plurality of processors only after said deconfiguration process has been completed.

15. The system according to claim 14, further comprising in response to said detecting an error, means for requesting deconfiguration of said one of said plurality of processors.

16. Tha system according to claim 14, further comprising in response to said one of said plurality of processors being deconfigured, means for providing an indication that said one of said plurality of processors has been deconfigured.

17. The system according to claim 14, further comprising:
   an exception handler routine;
   said exception handler routine for detecting said error in said one of said plurality of processors;
   said exception handler routine for determining whether said one of said plurality of processors has been deconfigured; and
   said exception handler routine for requesting a reboot of said configured ones of said plurality of processors.

18. The system according to claim 17, further comprising said exception handler routine for requesting said one of said processors be deconfigured.

19. The system according to claim 14, further comprising:
   means for receiving a request to deconfigure said one of said plurality of processors;
   means for deconfiguring said one of said plurality of processors; and
   means for storing an indication of deconfiguration in response to a completion of deconfiguring said one of said plurality of processors.

20. The system according to claim 19, further comprising a non-volatile memory for storing said indication.

21. The system according to claim 14, further comprising:
   a service processor within said logically partitioned data processing system;
   in response to said detecting an error, said service processor for deconfiguring said one of said plurality of processors; and
   said service processor for providing an indication that said one of said plurality of processors has been deconfigured.

22. The system according to claim 14, wherein said means for detecting an error in one of said plurality of processors further comprises means for detecting a hard error in one of said plurality of processors.

23. The system according to claim 14, wherein said means for detecting an error in one of said plurality of processors further comprises means for detecting an address translation error in one of said plurality of processors.

24. The system according to claim 14, wherein said means for detecting an error in one of said plurality of processors further comprises means for detecting a translation look aside buffer address translation error in one of said plurality of processors.

25. The system according to claim 14, wherein said means for detecting an error in one of said plurality of processors further comprises means for detecting a data effective to real address translation error in one of said plurality of processors.

26. A system for preventing machine crashes due to hard errors in one of a plurality of processors in a logically partitioned data processing system, said system comprising:
an error handler routine;
a service processor within said logically partitioned data processing system;
said error handler routine for detecting an error in one of said plurality of processors;
in response to said error handler routine detecting an error, said error handler routine for requesting said service processor to deconfigure said one of said plurality of processors;
said service processor for deconfiguring said one of said plurality of processors;
in response to a completion of said deconfiguration of said one of said plurality of processors, said service processor for storing an indication in a non-volatile memory that said one of said plurality of processors has been deconfigured;
said error handler routine for determining whether an indication has been stored in said non-volatile memory indicating that said one of said plurality of processors has been deconfigured;
only in response to a determination that said indication has been stored in said non-volatile memory that said one of said plurality of processors has been deconfigured, said exception handler routine for requesting a reboot of configured ones of said plurality of processors; and
said service processor for rebooting said configured ones of said plurality of processors.

27. A computer program product for preventing machine crashes due to hard errors in one of a plurality of processors in a logically partitioned data processing system, said computer program product comprising:
instruction means for detecting an error in one of said plurality of processors;
instruction means for starting a deconfiguration process to deconfigure said one of said plurality of processors;
instruction means for determining whether said deconfiguration process to deconfigure said one of said plurality of processor has been completed;
instruction means for waiting until said deconfiguration process has been completed before requesting said reboot of said system;
instruction means for requesting said reboot of said system only in response to a determination that said deconfiguration process has been completed; and
instruction means for rebooting only configured ones of said plurality of processors only after said deconfiguration process has been completed.

28. The product according to claim 27, further comprising in response to said detecting an error, instruction means for requesting deconfiguration of said one of said plurality of processors.

29. The product according to claim 27, further comprising in response to said one of said plurality of processors being deconfigured, instruction means for providing an indication that said one of said plurality of processors has been deconfigured.

30. The product according to claim 27, further comprising:
instruction means for providing an exception handler routine;
instruction means for detecting, utilizing said exception handler routine, said error in said one of said plurality of processors;
instruction means for determining, utilizing said exception handler routine, whether said one of said plurality of processors has been deconfigured; and
instruction means for requesting, utilizing said exception handler routine, a reboot of said configured ones of said plurality of processors.

31. The product according to claim 30, further comprising instruction means for requesting, utilizing said exception handler routine, said one of said processors be deconfigured.

32. The product according to claim 27, further comprising:
instruction means for receiving a request to deconfigure said one of said plurality of processors;
instruction means for deconfiguring said one of said plurality of processors; and
instruction means for storing an indication of deconfiguration in response to a completion of deconfiguring said one of said plurality of processors.

33. The product according to claim 32, further comprising instruction means for storing said indication in non-volatile memory.

34. The product according to claim 27, further comprising:
instruction means for providing a service processor within said logically partitioned data processing system;
in response to said detecting an error, instruction means for deconfiguring said one of said plurality of processors utilizing said service processor; and
instruction means for providing, utilizing said service processor, an indication that said one of said plurality of processors has been deconfigured.

35. The product according to claim 27, wherein said instruction means for detecting an error in one of said plurality of processors further comprises instruction means for detecting a hard error in one of said plurality of processors.

36. The product according to claim 27, wherein said instruction means for detecting an error in one of said plurality of processors further comprises instruction means for detecting an address translation error in one of said plurality of processors.

37. The product according to claim 27, wherein said instruction means for detecting an error in one of said plurality of processors further comprises instruction means for detecting a translation look aside buffer address translation error in one of said plurality of processors.

38. The product according to claim 27, wherein said instruction means for detecting an error in one of said plurality of processors further comprises instruction means for detecting a data effective to real address translation error in one of said plurality of processors.

39. A computer program product for preventing machine crashes due to hard errors in one of a plurality of processors in a logically partitioned data processing system, said computer program product comprising:

instruction means for providing an error handler routine;

instruction means for providing a service processor within said logically partitioned data processing system;

instruction means for detecting, utilizing said error handler routine, an error in one of said plurality of processors;

in response to said error handler routine detecting an error, instruction means for requesting, utilizing said error handler routine, said service processor to deconfigure said one of said plurality of processors;

instruction means for deconfiguring, utilizing said service processor, said one of said plurality of processors;

in response to a completion of said deconfiguration of said one of said plurality of processors, instruction means for storing, utilizing said service processor, an indication in a non-volatile memory that said one of said plurality of processors has been deconfigured;

instruction means for determining, utilizing said error handler routine, whether an indication has been stored in said non-volatile memory indicating that said one of said plurality of processors has been deconfigured;

only in response to a determination that said indication has been stored in said non-volatile memory that said one of said plurality of processors has been deconfigured, instruction means for requesting, utilizing said error handler routine, a reboot of configured ones of said plurality of processors; and instruction means for rebooting, utilizing said service processor, said configured ones of said plurality of processors.

* * * * *

UNITED STATES PATENT AND TRADEMARK OFFICE
CERTIFICATE OF CORRECTION

PATENT NO. : 6,898,731 B2  Page 1 of 1
APPLICATION NO. : 10/045280
DATED : May 24, 2005
INVENTOR(S) : Hack et al.

It is certified that error appears in the above-identified patent and that said Letters Patent is hereby corrected as shown below:

Col. 10, line 30: before "system" delete "Tha" and insert --The--.

Signed and Sealed this

Fifth Day of December, 2006

JON W. DUDAS
*Director of the United States Patent and Trademark Office*